United States Patent [19]
Scott

[11] Patent Number: 5,803,407
[45] Date of Patent: Sep. 8, 1998

[54] APPARATUS AND METHODS FOR IN-SPACE SATELLITE OPERATIONS

[76] Inventor: David R. Scott, 1300-B Manhattan Ave., Manhattan Beach, Calif. 90266

[21] Appl. No.: 427,419

[22] PCT Filed: Nov. 14, 1994

[86] PCT No.: PCT/US94/13052

§ 371 Date: Apr. 21, 1995

§ 102(e) Date: Apr. 21, 1995

[87] PCT Pub. No.: WO95/14611

PCT Pub. Date: Jun. 11, 1995

Related U.S. Application Data

[63] Continuation-in-part of Ser. No. 152,459, Nov. 12, 1993, Pat. No. 5,511,748.

[51] Int. Cl.[6] .............................. B64G 1/24; H04B 7/155
[52] U.S. Cl. ......................... 244/161; 244/161; 244/189; 244/164; 244/171; 342/355
[58] Field of Search ................................ 244/158 R, 161, 244/163, 189, 190, 164, 171; 342/355, 356, 352

[56] References Cited

U.S. PATENT DOCUMENTS

| | | | |
|---|---|---|---|
| 3,088,697 | 5/1963 | Cutler | 342/355 |
| 3,424,402 | 1/1969 | Rue | 244/190 |
| 3,907,226 | 9/1975 | Neufeld et al. | 244/169 |
| 3,910,533 | 10/1975 | Cheatham et al. | 244/161 |
| 4,834,531 | 5/1989 | Ward | 244/161 |
| 4,858,857 | 8/1989 | Lange et al. | 244/161 |
| 4,860,975 | 8/1989 | Schliesing et al. | 244/161 |
| 4,890,918 | 1/1990 | Monford | 244/161 |
| 5,015,187 | 5/1991 | Lord | 244/190 |
| 5,109,345 | 4/1992 | Dabney et al. | 244/161 |
| 5,119,305 | 6/1992 | Ferro | 244/161 |
| 5,142,482 | 8/1992 | Perkins et al. | 244/158 R |
| 5,258,764 | 11/1993 | Malinowski | 342/355 |
| 5,372,340 | 12/1994 | Ihara et al. | 244/161 |
| 5,511,748 | 4/1996 | Scott | 244/161 |

Primary Examiner—Andres Kashnikow
Assistant Examiner—Virna Lissi Mojica
Attorney, Agent, or Firm—Drummond & Duckworth

[57] ABSTRACT

The life of a target satellite is modified, i.e., extended or terminated by docking an extension spacecraft with the target satellite to form a docked satellite-spacecraft combination. The extension spacecraft is docked with and mechanically connected to the target satellite and includes guidance, navigation, and control systems for performing the rendezvous and docking maneuvers and for controlling the position of the docked spacecraft-satellite combination. The extension spacecraft also includes an onboard propellant supply for accomplishing the rendezvous and docking of the spacecraft with the satellite and for controlling the position of the docked spacecraft-satellite combination. A remote cockpit system is provided to permit human control of the extension spacecraft during proximity operations.

1 Claim, 8 Drawing Sheets

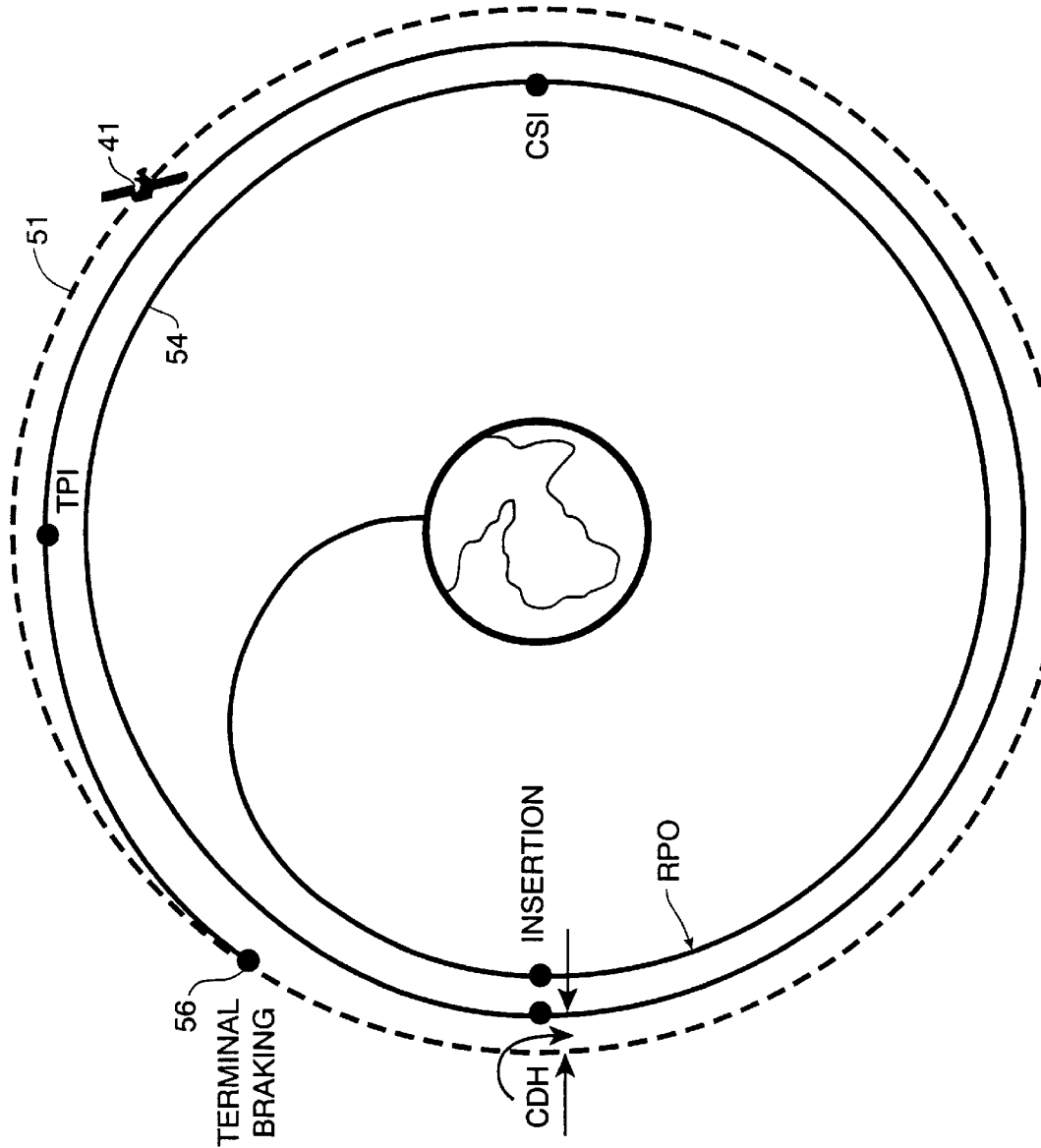

APPARATUS AND METHODS FOR IN-SPACE SATELLITE OPERATIONS

This application is a continuation-in part of my pending U.S. patent application Ser. No. 08/152,459, filed Nov. 12, 1993, now U.S. Pat. No. 5,511,798.

This invention pertains to apparatus and methods for in-space satellite operations, such as modifying the useful life of a space satellite, inspecting it, adjusting its space trajectory, or the like.

More particularly, the invention relates to such apparatus and methods for extending or otherwise modifying the useful operational lifetime of satellites which perform communications, weather reconnaissance, space reconnaissance and similar functions.

In another respect, the invention pertains to such apparatus and methods for extending the useful life of such satellites without performing complicated in-space refueling or repair functions.

According to still another aspect, the invention pertains to apparatus and methods for effecting planned deorbit and reentry of a satellite or reboosting a spent satellite to a higher orbit or another trajectory, to delay deorbit or to place a satellite in a parking or other operational or non-operational orbit or trajectory.

In yet another aspect, the invention pertains to apparatus and methods for performing a variety of proximity operations, e.g., inspection of an operational or non-operational satellite, to determine its status, etc.

Because of the high reliability of contemporary electronics, the end-of-life (EOL) of most satellites is caused by on board propellant depletion and the corresponding loss of attitude and position control, i.e., for orientation, pointing, including stabilization, and orbit control. The previous proposed approach to extending EOL is to replenish the propellant in the satellite tanks by refueling from another spacecraft. Alternatively, mechanical attachment of additional external propellant tanks to the target satellite would also accomplish this objective.

In addition to EOL by normal propellant depletion, there have been numerous instances in which satellites have been initially delivered to unacceptable orbits. These orbits could have been corrected by additional propulsion maneuvers. However, use of the satellites' onboard propellant to move it to an acceptable orbit resulted in a corresponding reduction in the useful life of the satellite. In some instances, initial orbit correction was impossible because it would have completely depleted the satellite's onboard propellant supply.

In the past, considerable effort has been expended to develop in-space refueling technology. However, this has required extensive and expensive modifications to conventional satellites, risky proximity operations, possible contamination of the satellite by escaping fuel and other practical problems.

Conversely, when extension of the operating life of a satellite cannot be effected for various reasons, e.g., other malfunctions of a satellite or its equipment which cannot be repaired or obsolescence of the satellite, it would be desirable to be able to effect pre-planned deorbit and reentry. In this way, the inoperable or obsolescent satellite will not continue to clutter the available space for working satellites and reduce the likelihood of collision with other satellites or space vehicles. If the deorbit and reentry can be preplanned, these techniques will also reduce the possibility of reentry into populated areas with possible disastrous results. Furthermore, even if planned deorbit and reentry is not necessary or if it would be desirable to otherwise change the space trajectory of a satellite, it would be desirable to provide apparatus and methods for changing the space trajectory of a satellite to another operational or non-operational trajectory or for reboosting satellites which are cluttering useful orbits or which are about to deorbit, into less cluttered and less dangerous parking orbits.

The principal object of the present invention is to provide apparatus and methods for in-space satellite operations, such as, for as, for example, extending or otherwise modifying the useful life of a space satellite, modifying its space trajectory, etc.

Yet another object of the invention is to provide such extension of useful life of a space satellite by simplified method and using simplified apparatus in comparison to prior art techniques which involve refuelling the space satellite.

Still another object of the invention is to provide apparatus and methods which permit planned deorbit and reentry of spent or obsolete satellites, which permit changing the space trajectory of a satellite to another operational or non-operational trajectory or which permit reboosting spent or obsolete satellites to a parking orbit.

These, other and further objects and advantages of the invention will be apparent to those skilled in the art from the following detailed description thereof, taken in conjunction with the drawings, in which:

FIG. 5–7 illustrate a typical mission scenario performed by the apparatus and method of the invention, to transfer a satellite from an unusable orbit to its intended operational orbit and thereafter provide stationkeeping and pointing for the docked combination extension spacecraft-target satellite.

Figure 1:
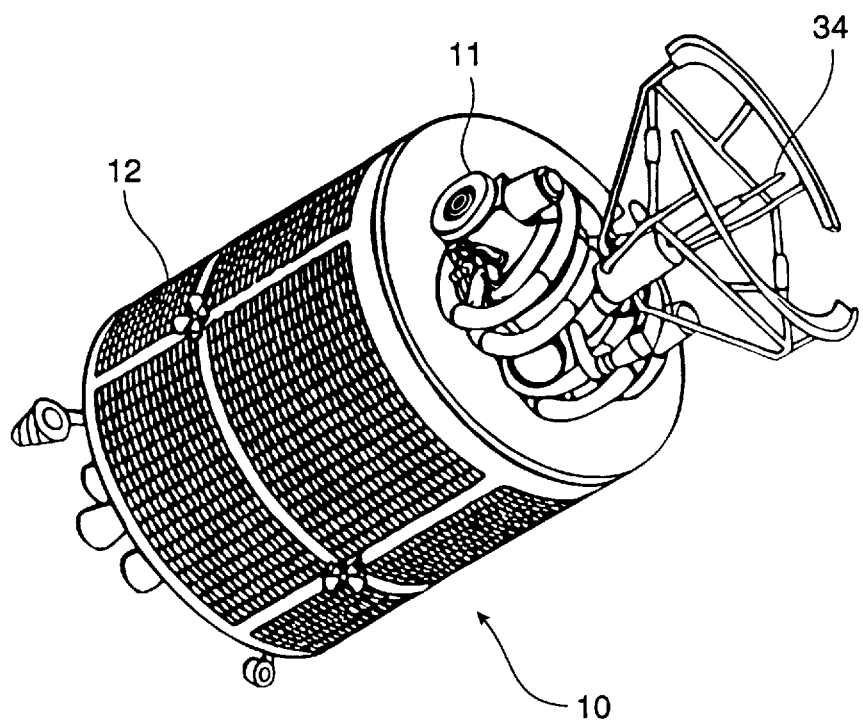
FIG. 1 is a perspective view of an extension spacecraft, configured in accordance with a presently preferred embodiment of the invention.

Briefly, in accordance with one embodiment of the invention, I provide apparatus for adjusting the life of a target satellite. The apparatus comprises an extension spacecraft which is used to form a docked satellite-spacecraft combination. The extension spacecraft includes docking means for mechanically connecting the target satellite and the extension spacecraft to form the docked satellite-spacecraft combination, guidance, navigation and control systems and an onboard propellant supply. The guidance, navigation and control systems of the extension spacecraft provide the means for controlling the position of the docked satellite-spacecraft combination. The onboard propellant supply is sufficient to provide for rendezvous and docking of the spacecraft with the satellite and for position control of the docked satellite-spacecraft combination.

In a preferred embodiment of the invention, I provide additional apparatus and methods for closed-loop telepresence, wherein the movement of the extension spacecraft relative to the target satellite is controlled by uplink signals from human operated hand controllers in a remote cockpit (which includes the guidance computer), in response to visual displays generated from spacecraft onboard cameras, to provide teleoperation of the extension spacecraft during proximity operations, such as docking, inspection, etc.

As used herein the term "adjusting the life of a target satellite" means either extending the useful life of a target satellite, which is normally limited by the availability of onboard propellant for position control, or terminating the orbiting activity of a spent or obsolete satellite by planned deorbit and reentry or by transferring a satellite from its previous orbit another trajectory or to a parking orbit.

As used herein the term "controlling the position of the docked satellite-spacecraft combination" includes both controlling the trajectory of the docked combination relative to the earth and/or controlling the attitude of the docked combination relative to the earth or to the star field.

In accordance with another embodiment of the invention, I provide a method for adjusting the life of a target satellite. The method of the invention comprises the steps of mechanically connecting an extension spacecraft to the target satellite, forming a docked satellite-spacecraft combination and activating the guidance, navigation and control systems of the extension spacecraft to provide position control for the docked satellite-spacecraft combination. The extension spacecraft used in this method includes onboard propellant supply for position control of the docked satellite-spacecraft, after docking.

In a preferred embodiment of the invention, the method and apparatus include use of a "remote cockpit" which contains a guidance computer, hand controllers and a visual display. Uplink signals from the guidance computer, based on the "control laws" and inputs from human-operated hand controllers (in response to visual displays generated from spacecraft onboard television cameras and other processed downlink inputs, such as attitude, consumables, caution/warning, etc.) provide teleoperation of the spacecraft during proximity operations, e.g., docking, inspection, etc.

Figure 2:
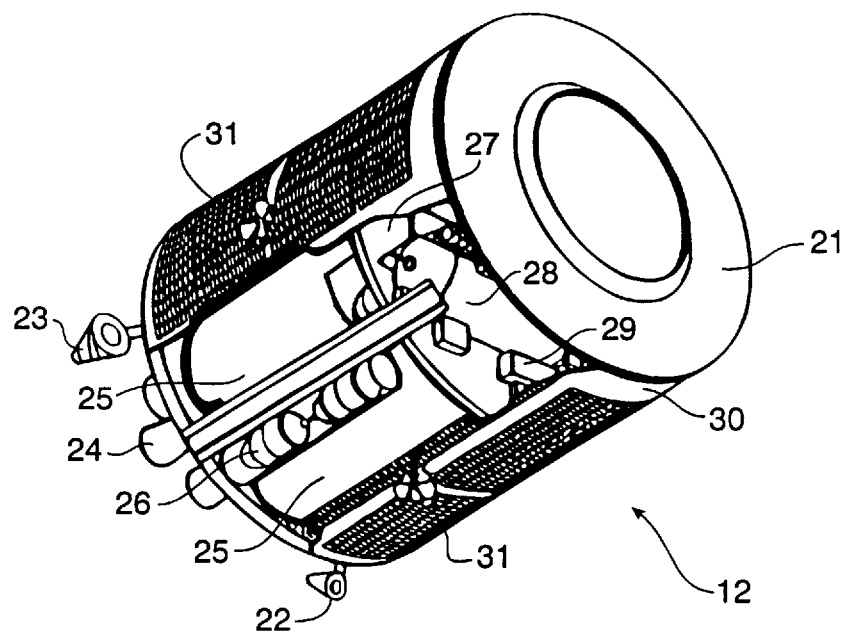
FIG. 2 is a partially cut-away perspective view of the service module of the extension spacecraft of FIG. 1.
Figure 3:
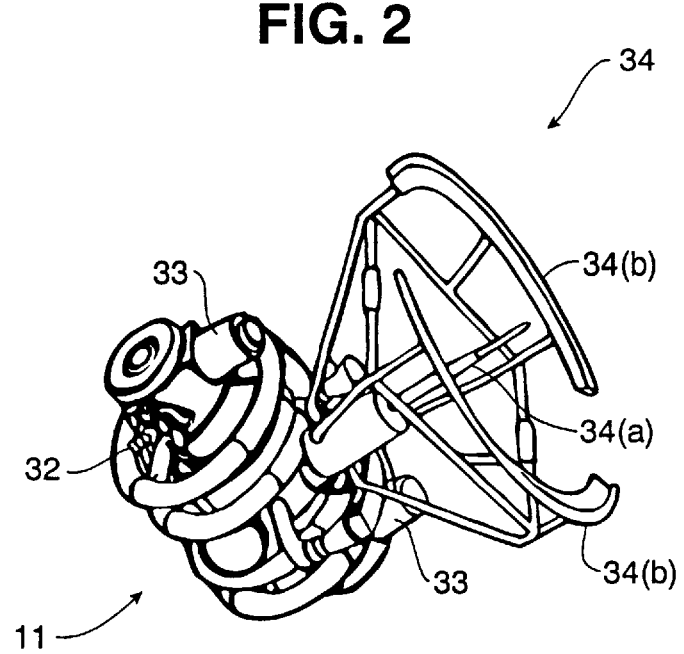
FIG. 3 is a perspective view of the command module of the extension spacecraft of FIG. 1.
Figure 4A:
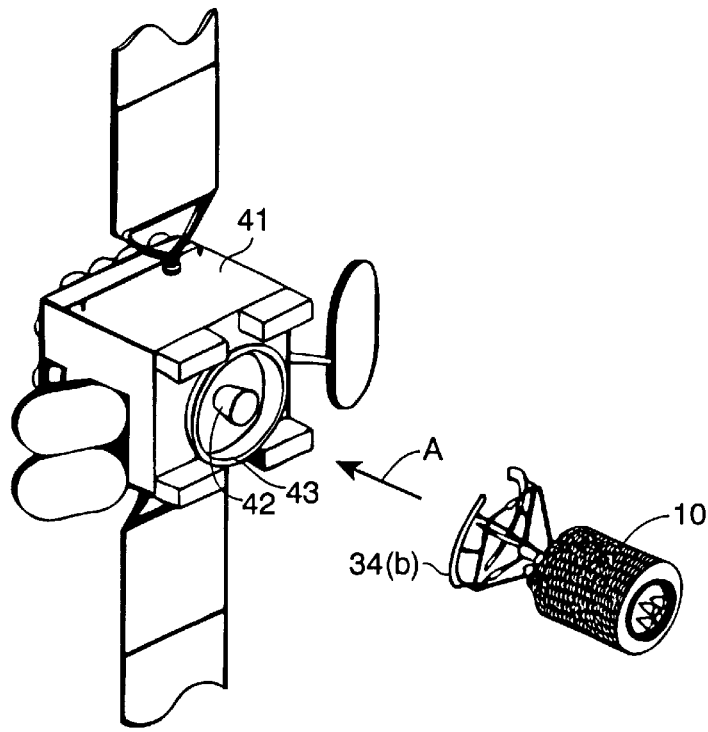
FIG. 4 illustrates the docking maneuvers and mechanical interconnection of the extension spacecraft of FIG. 1–3 with a target satellite.
Figure 4B:
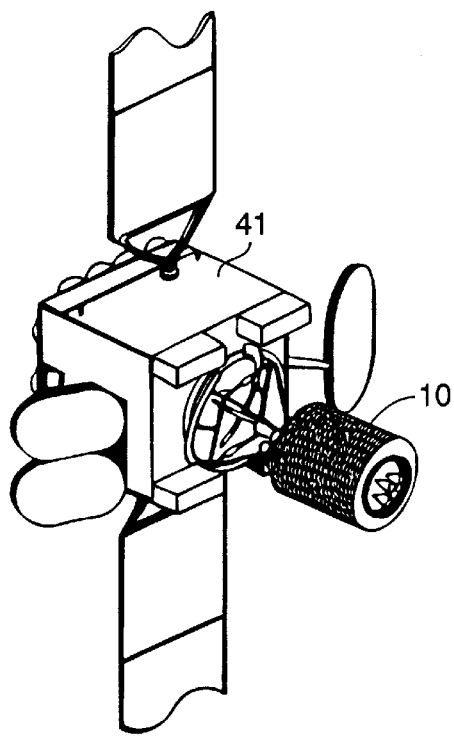

Turning now to the drawings, FIGS. 1–3 illustrate an extension spacecraft constructed in accordance with and used in accordance with the principles of the present invention. The spacecraft 10 comprises a command module 11 and a service module 12. The extension satellite embodies exoatmospheric construction and is adapted to be carried into space, e.g., to a rendezvous phasing orbit or low early orbit in the enclosed cargo bay or within the enclosing shroud of an earth launch vehicle such as, for example, the Taurus or the Space Shuttle, depending on mission requirements, availability, cost, etc. For example, in one embodiment of the invention, the baseline earth launch vehicle is the Delta 7920, which has a low earth orbit pay load insertion capability of approximately 5,000 kilograms and a geosynchronous transfer orbit of approximately 1,300 kilograms.

The service module 12 operates as a "space bus" for the command module 11, providing among other functions, propulsion, power and communications support, thus minimizing the requirements for corresponding subsystems in the command module 11. The operations phase design lifetime of the command module 11 for in-space servicing can therefore be relatively short, based on specific programmed tasks at the target vehicle during a fixed period of activity. For certain missions, the command module 11 will separate from the service module 12 and operate independently. Also, for certain missions, a space transfer vehicle (STV), such as that disclosed in my issued U.S. Pat. No. 5,242,135, can be employed to transfer the extension spacecraft 10 from the launch insertion orbit to a rendezvous phasing orbit (RPO).

As will be apparent to those skilled in the art, all of the functions of the command module 11 could be incorporated into the service module 12, although the separate command and service modules herein described provide for maximum mission flexibility and are, accordingly, a presently preferred embodiment of the invention.

Referring more particularly to FIG. 2, the primary purpose of the service module 12 is to augment the propulsion capabilities of the command module 11. For example, if the command module 11 is configured as a variant of the SDIO Lightweight Exoatmospheric Projectile (LEAP) Vehicle, the service module 12 can be based on the design of the existing "Small Altimeter" (SALT) satellite manufactured for the United States Navy by Intraspace, Inc., North Salt Lake City, Utah. The service module 12 includes a command module adapter ring 21, GPS antenna 22, S-Band OMNI antenna 23, orbit insertion motors 24, propellant tanks 25, batteries, 26. Mounted on the mid-deck 27 is a reaction control system 28 and on-board processor 29. These components are enclosed by a monocoque structure 30, on which are mounted solar power cell arrays 31.

The service module 12 is sized to perform all rendezvous and proximity maneuvers, as well as specific transfer maneuvers required for the extension spacecraft-target satellite docked combination. For certain target spacecraft locations, the energy requirements to position the extension spacecraft for rendezvous may be greater than that available from the service module 12, for example, an inclination change for the target satellite. In such cases, the STV would be added to the extension spacecraft 10 to augment the propulsion capabilities of the service module 12.

For major maneuvers, the service module 12 is equipped with a storable bipropellant system consisting of a "quad" array of four uprated Marquardt R-4-D 490 Newton (100 lb.) thrust axial engines. This configuration provides adequate thrust-to-weight ratio to minimize the effects of non-impulsive maneuvers, as well as redundancy for engine-out capability to complete the mission. Marquardt R-4-D engines are selected for their very high reliability, high Isp (322 seconds), maturity (over 800 produced) and availability.

To prevent contamination of the target satellite when the extension spacecraft is stationkeeping, the extension spacecraft attitude control system is a nitrogen cold gas system consisting of 16×5 lb. thrusters mounted in quads on the circumference of the service module 12. This configuration enables both three-axis rotation and three-axis translation for, example, for stationkeeping and docking.

Referring more specifically to FIG. 3, the command module 11 includes several major subsystems, including guidance, navigation and control (GNC) system used for all extension spacecraft operations, a main propulsion system with "divert" thrusters of approximately 100 lbs. (490 N) thrust each, an attitude control system, and data and communication subsystems. The command module payload consists of a "seeker" subsystem with sensors for target location, tracking and inspection, and a docking system with various servicing devices such as a docking apparatus or robotic arms with clamps or grippers.

The basic configuration of the command module 11 is defined as a completely independent vehicle to enhance mission planning flexibility, minimize interface requirements, maximize the use of existing or developmental small spacecraft, and enable independent testing and verification of certain proximity operations and hardware in ground facilities prior to launch. The command module 11 may remain attached to the service module 12 (as for the UHF-1 recovery mission, described below), or it may be detached to operate autonomously. The service module 12 could, therefore, carry two or more command modules 11. In such configuration, the service module 12 acts as the primary spacecraft and the command module or modules can be detached for use as observation spacecraft. In either case, prior to separation of the command module(s) 11, certain rendezvous braking maneuvers would be performed by the divert thrusters of the combined command module-service module.

The baseline design command module 11 consists of a variant of the SDIO LEAP with minor modifications. The Rocketdyne AHIT Vehicle is selected as the baseline command module 11. This vehicle has completed several full-up hover tests in the SDIO National Hover Test Facility. In current configuration it weighs 10.2 kilograms, including 1.7 kilograms of propellant. It produces a delta velocity increment of 357 m/sec.

In this configuration, the command module includes cold gas attitude control system thrusters 32 and two divert thrusters 33 which have significantly higher thrust (490 N, 100 lb.) than the service module engines (5 lb.). These divert thrusters 33 are aligned along the line of sight from the service module 12 toward the target satellite. These divert thrusters 33 would not be used in close proximity to the target satellite to preclude contamination of the satellite. The remaining two divert thrusters of the AHIT vehicle are removed.

This forward alignment of the divert thrusters enables the seeker assembly to be continuously oriented toward the target satellite, thus precluding the necessity of rotating the extension spacecraft 180 degrees opposite to the target line of site to perform braking maneuvers. Although the engines 24 of the service module 12 could be used to perform braking, the low thrust level of these engines (20 lbs. total) would result in much longer burn times and very narrow margins in ignition time, burn durations, orbital position, and relative velocity.

Figure 6:
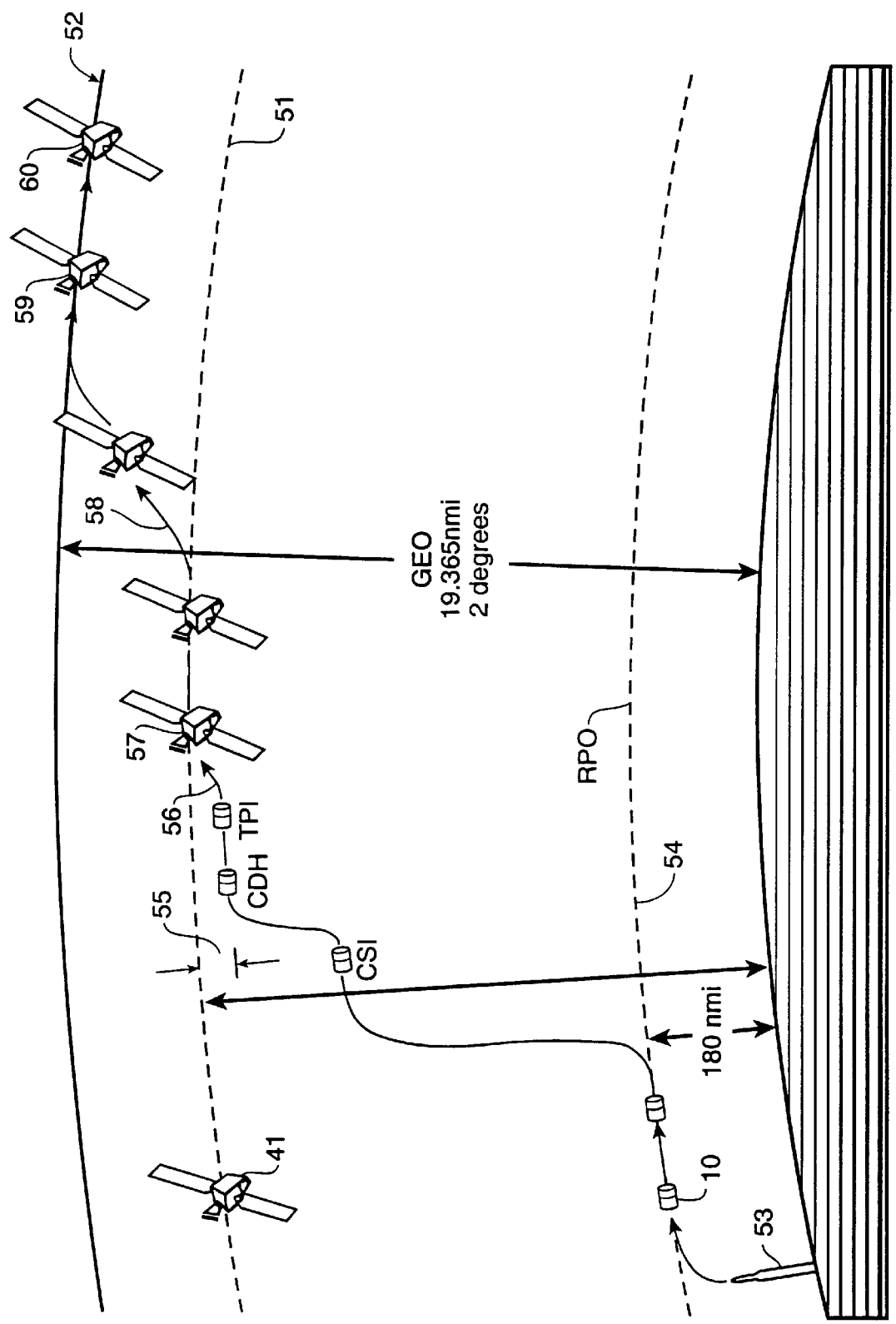
Figure 7:
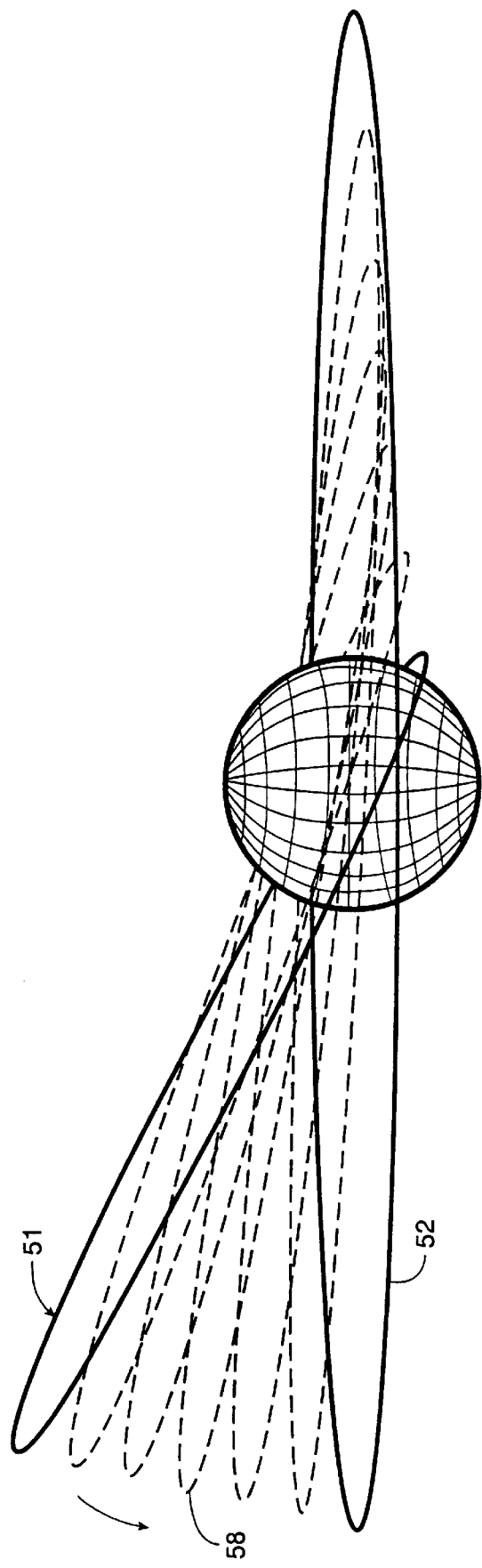

FIGS. 5–7 illustrate a typical mission scenario which can be accomplished by the apparatus and methods of the present invention. Illustratively, this scenario envisions the recovery of the navy UHF-1 satellite which was launched into a non-operational orbit on Mar. 29, 1993, by a degraded launch vehicle. Subsequently, the Navy stated that the UHF-1 satellite is a total loss. At present, the UHF-1 satellite 41 is in essentially a geosynchronous transfer orbit 51 with a perigee at 118 nm, apogee at 19,365 nm and an inclination at 27 degrees. The recovery flight profile depicted in FIGS. 5–7 is designed to accomplish insertion of the satellite 41 into geostationary orbit (GEO) 52 by circularizing the orbit and reducing its inclination to approximately zero degrees.

To accomplish this mission, the extension spacecraft 10 is launched from the earth by an earth launch vehicle 53, into a Rendezvous Phasing Orbit (RPO) 54 with a perigee of 180 nm, an apogee of approximately 19,345 nm and an inclination of 27 degrees. After insertion of the extension spacecraft 10 into RPO, a four-impulse sequence is initiated which consists of coeliptic sequence initiation (CSI), constant delta height (CDH), terminal phase initiation (TPI) and braking. CSI establishes a desired ratio of relative height to phase angle between the extension spacecraft 10 and the target satellite 41. CSI also establishes, based on subsequent maneuvers, the standard lighting conditions as well as transfer time for the final approach to the target 41. CDH establishes a constant differential altitude between the extension spacecraft 10 and the target satellite. TPI establishes an extension spacecraft trajectory that will intercept the target satellite 41 at a specific time and position on the orbit 52 of the target satellite 41. A nominal transfer interval of 130 degrees is used to optimize propellant usage, provide adequate control authority during the final approach, insure the apparent inertial motion of the target satellite 41 (relative to the starfield) as near zero during the latter part of the intercept, and insure that the transfer is along the line of sight. Braking is performed as a series of distinct maneuvers performed at specific range/rate "gates", each of which occurs at a range from the target where the actual range/rate is reduced to a preplanned value. The maneuvers at these gates gradually reduce the relative velocity between the vehicles to zero. After docking of the extension spacecraft 10 with the target satellite 41, the docked combination 57 then perform a series of maneuvers to raise the perigee of the docked combination 58 through intermediate orbits (indicated by the dash lines on FIG. 7) to raise the perigee to 19,365 nm and reduce the inclination to near zero, placing the docked combination in final operational orbit (GEO) 52.

Figure 8:
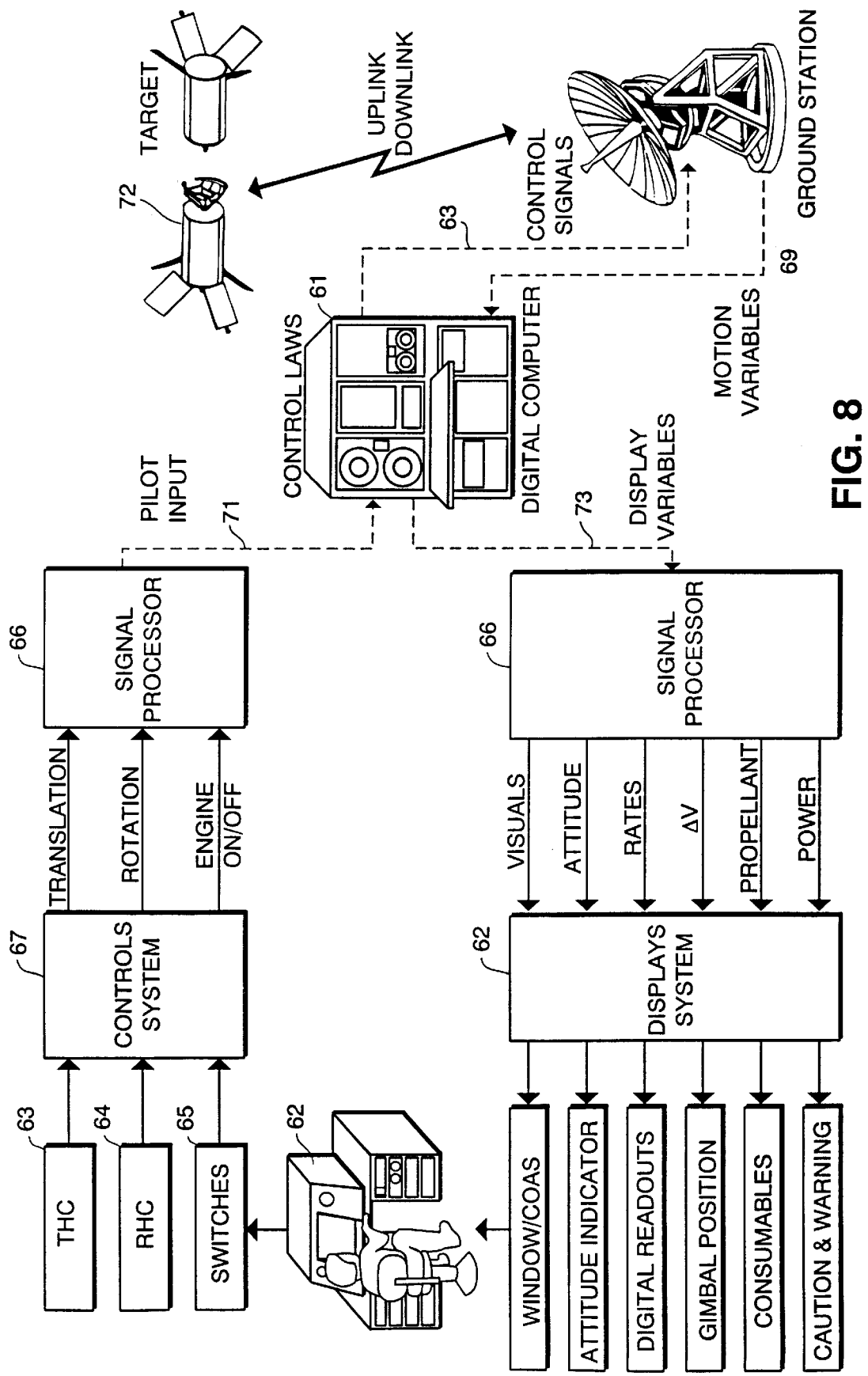
FIGS. 8–9 illustrate a remote cockpit system employed in the preferred embodiment of the invention to provide human control of proximity operations such as docking, inspection, etc.
Figure 9:
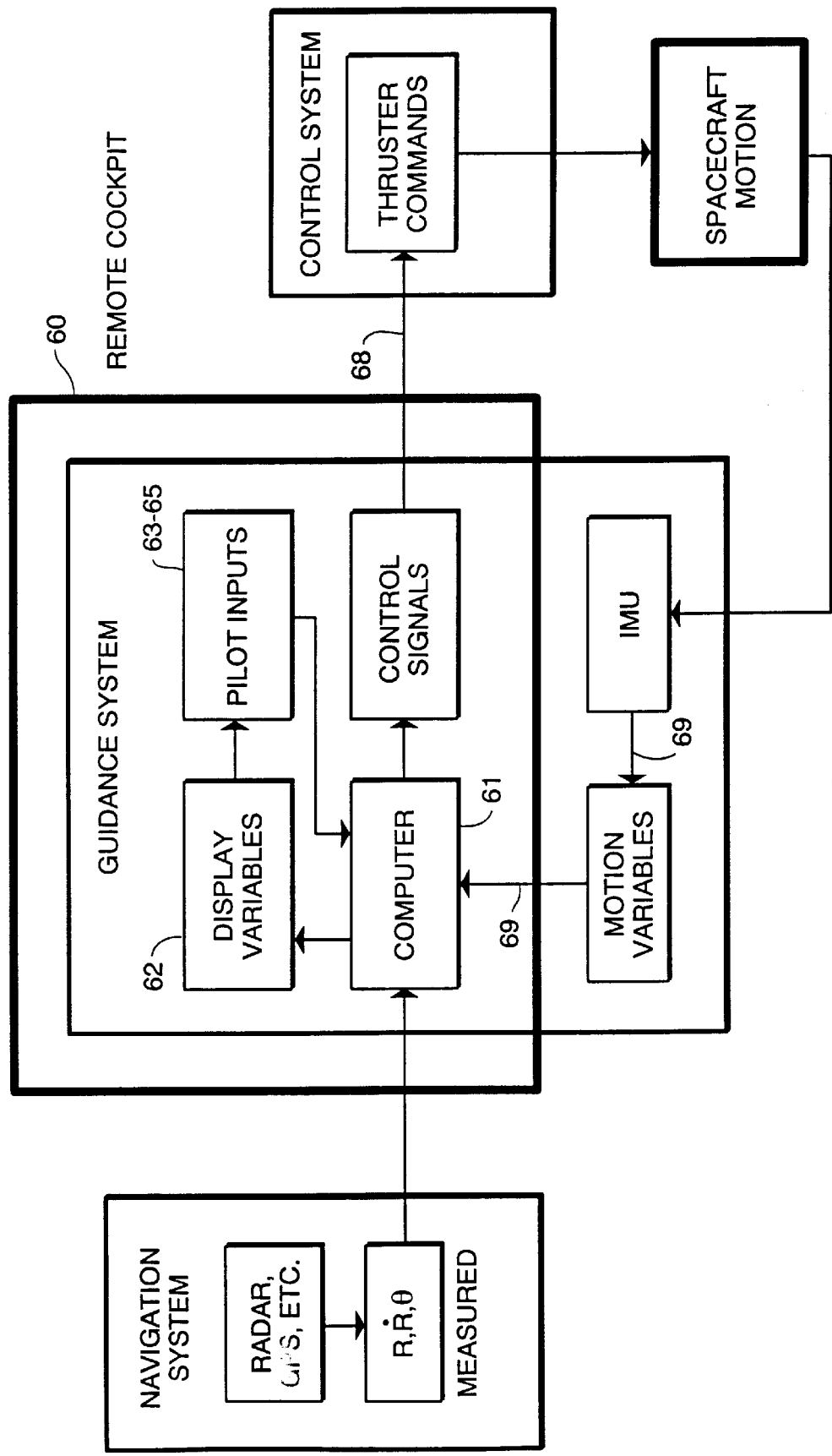

FIGS. 8–9 depict the system and methods of the presently preferred embodiment of the invention, which includes a "remote cockpit" 60 for human control of rendezvous and proximity operations, e.g., inspection and/or docking. The remote cockpit 60, which can be located on the ground or on board another spacecraft, includes the Guidance, Navigation and Control System computer 61 containing the control laws, a controls system 67 and variables display 62. The controls system 67 includes pilot operated translation hand controller 63, rotational hand controller 64, and engine on-off switches 65. Appropriate signal processors 66 are provided to generate the uplinked control signals 68 and downlinked spacecraft motion variables signals 69. Processed control signals 71 ("pilot input") from the controls system 67 and its associated signal processor 66, are uplinked to the spacecraft 72, which, in turn, provides downlinked motion variables signals 69 to the GNC computer 61 to generate the display variables signals 73 to the signal processor 66 of the displays system 62.

Having described by invention in such terms as to enable those skilled in the art to understand and practice it, and having identified the presently preferred embodiments thereof, I claim:

1. A ground control remote cockpit system for remotely controlling operations of an orbitable spacecraft comprising:

a cockpit system situated at a location remote from said spacecraft, said cockpit further including;

(a) a guidance, navigation and control computer for said spacecraft, located in said cockpit remote from said spacecraft;

(b) a spacecraft variables display system located in said remote cockpit, including a visual display for displaying signals down-linked through said computer from television camera means and motion sensor means onboard said spacecraft; and (c) control means adapted to be manually operated by a human pilot in said remote cockpit in response to displays on said display system, said control means including means to generate pilot input signals through said computer which provide control of attitude and velocity of said spacecraft, said pilot input signals up-linked to said spacecraft to control sad spacecraft during operations of said spacecraft.

* * * * *